United States Patent
Couchman et al.

(10) Patent No.: US 12,292,031 B1
(45) Date of Patent: May 6, 2025

(54) SYSTEM AND METHOD FOR DETECTING AND RESPONDING TO FAILURES IN A DRIVETRAIN OF A WIND TURBINE

(71) Applicant: General Electric Renovables Espana, S.L., Barcelona (ES)

(72) Inventors: Ian Couchman, Horley (GB); Till Hoffmann, Osnabrueck (DE); Thomas Franklin Perley, Bluffton, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/628,949

(22) Filed: Apr. 8, 2024

(51) Int. Cl.
*F03D 17/00* (2016.01)
*F03D 7/02* (2006.01)
(Continued)

(52) U.S. Cl.
CPC ......... *F03D 17/014* (2023.08); *F03D 7/0204* (2013.01); *F03D 7/0224* (2013.01); *F03D 7/0264* (2013.01); *F03D 9/25* (2016.05); *F03D 15/00* (2016.05); *F03D 17/033* (2023.08); *F05B 2260/80* (2013.01); *F05B 2270/327* (2013.01)

(58) Field of Classification Search
CPC ...... F03D 17/00; F03D 17/014; F03D 17/031; F05B 2270/327
See application file for complete search history.

(56) References Cited

U.S. PATENT DOCUMENTS

| | | | | |
|---|---|---|---|---|
| 7,417,332 | B2 * | 8/2008 | Malakhova | G01P 1/127 290/55 |
| 8,092,174 | B2 | 1/2012 | Egedal | |

(Continued)

FOREIGN PATENT DOCUMENTS

| | | |
|---|---|---|
| WO | WO2007/104585 A1 | 9/2007 |
| WO | WO2022/228630 A1 | 11/2022 |

OTHER PUBLICATIONS

Internet print-out of https://base.movella.com/s/article/What-is-the-relationship-between-gyroscopes-and-accelerometers-in-the-orientation-algorithm?language=en_US#:~:text=A%20rate%20gyro%20yields%20an,Sensor%20Bias)%20at%20zero%20rate. (Year: 2022).*
Plaza et al., Triaxial Accelerometer Based Azimuth Estimator for Horizontal Axis Wind Turbines, Journal of Wind Engineering & Industrial Aerodynamics, vol. 240, 2023, 105-463.

*Primary Examiner* — Christopher R Legendre
(74) *Attorney, Agent, or Firm* — Dority & Manning, P.A.

(57) ABSTRACT

A method for detecting and responding to a failure in a drivetrain of a wind turbine includes estimating a first rotational speed signal at a first location along the drivetrain via one or more rate gyroscopes mounted in a hub, the first rotational speed signal being a proxy for rotor speed of a rotor. The method also includes processing the first rotational speed signal to account for a bias in the first rotational speed signal due to use of the rate gyroscope(s). Further, the method includes receiving a second rotational speed signal at a second location along the drivetrain, the second location being downwind from the first location, the first and second locations being on opposing sides of a potential slip location of the drivetrain. Moreover, the method includes determining a speed error based on a comparison of the first and second rotational speed signals. In addition, the method includes comparing the speed error to a threshold and implementing a control action when the speed error exceeds the threshold.

20 Claims, 6 Drawing Sheets

(51) Int. Cl.
  *F03D 9/25* (2016.01)
  *F03D 15/00* (2016.01)

(56) References Cited

U.S. PATENT DOCUMENTS

| | | | |
|---|---|---|---|
| 8,794,920 B2 * | 8/2014 | Bacic | B64C 11/306 416/61 |
| 8,860,382 B2 * | 10/2014 | Freier | H02P 9/105 290/44 |
| 8,932,017 B2 * | 1/2015 | Heidenreich | F03D 9/25 290/55 |
| 10,436,181 B2 | 10/2019 | Slack et al. | |

* cited by examiner

SYSTEM AND METHOD FOR DETECTING AND RESPONDING TO FAILURES IN A DRIVETRAIN OF A WIND TURBINE

FIELD

The present disclosure relates in general to wind turbines, and more particularly to systems and methods for detecting and responding to failures in a drivetrain of a wind turbine, such as a slip event in the drivetrain.

BACKGROUND

Wind power is considered one of the cleanest, most environmentally friendly energy sources presently available, and wind turbines have gained increased attention in this regard. A modern wind turbine typically includes a tower, a nacelle mounted atop the tower, a rotor mounted to the nacelle having one or more rotor blades, and a drivetrain within the nacelle. The drivetrain typically includes various drivetrain components, such as a generator and a gearbox. Further, the drivetrain can contain one or more friction connections, e.g., couplings or shrink fits in either the HSS section or the LSS section. The nacelle includes a rotor assembly coupled to the gearbox and to the generator. In many wind turbines, the generator and the gearbox are mounted to a bedplate within the nacelle via one or more torque arms. As such, the one or more rotor blades capture kinetic energy of wind using known airfoil principles. The rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

Oftentimes, the wind turbine may be equipped with various sensors for determining rotational speed conditions of the drivetrain, such as generator speed. However, if any of the drivetrain connections slip/decouple, then the measured generator speed is no longer a good proxy for the rotor speed (when scaled by the gearbox ratio). As the generator speed is generally the primary speed measurement used by the turbine controller for rotor speed control, if the generator speed is not a good proxy for rotor speed, the wind turbine can become damaged. For example, in the case of an LSS shrink fit slip, the generator speed reduces whilst the rotor speed does not. In this instance, the turbine controller pitches to power to increase the generator speed which leads to excessive rotor speeds and thrust driven loads.

As such, the present disclosure is directed to systems and methods that detect deviations between speed measurements at locations along the drivetrain from the rotor to the generator and implement a control action in the event of a significant deviation so as to avoid the aforementioned issues.

BRIEF DESCRIPTION

Aspects and advantages of the present disclosure will be set forth in part in the following description, or may be obvious from the description, or may be learned through practice of the present disclosure.

In an aspect, the present disclosure is directed to a method for detecting and responding to a failure in a drivetrain of a wind turbine. The drivetrain has, at least, a rotor and a generator. The method includes estimating, via a controller, a first rotational speed signal at a first location along the drivetrain via one or more rate gyroscopes mounted in the wind turbine, the first rotational speed signal being a proxy for rotor speed of the rotor of the wind turbine. The method also includes processing, via the controller, the first rotational speed signal to account for a bias in the first rotational speed signal due to use of the one or more rate gyroscopes. Further, the method includes receiving, via the controller, a second rotational speed signal at a second location along the drivetrain, the second location being downwind from the first location, the first and second locations being on opposing sides of a potential slip location of the drivetrain. Moreover, the method includes determining, via the controller, a speed error based on a comparison of the first and second rotational speed signals. In addition, the method includes comparing, via the controller, the speed error to a threshold and implementing, via the controller, a control action for the wind turbine when the speed error exceeds the threshold.

In another aspect, the present disclosure is directed to drivetrain assembly of a wind turbine. The drivetrain assembly includes a rotor shaft for coupling to a rotor of the wind turbine, a gearbox coupled to the rotor shaft, a generator coupled to the gearbox via a generator shaft, and a controller for controlling operation of the wind turbine. The controller includes at least one processor configured to perform a plurality of operations, including but not limited to estimating a first rotational speed signal at a first location along the drivetrain via one or more rate gyroscopes mounted in the wind turbine, the first rotational speed signal being a proxy for rotor speed of the rotor of the wind turbine; processing the first rotational speed signal to account for a bias in the first rotational speed signal due to use of the one or more rate gyroscopes; receiving a second rotational speed signal from a second location along the drivetrain assembly, the second location being downwind from the first location, the first and second locations being on opposing sides of a potential slip location of the drivetrain assembly; determining a speed error based on a comparison of the first and second rotational speed signals; comparing the speed error to a threshold; and implementing a control action for the wind turbine when the speed error exceeds the threshold.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Generally, the present disclosure is directed to systems and methods for detecting drive train speed deviations (for example, those that may be caused by a slip or decoupling event) and responding to such events in a way that limits the impact on the turbine. At the generator end, high fidelity encoders may be used to detect generator speed. However, encoder solutions are more difficult for the LSS due to the lower speeds. As such, in an embodiment, speed measurements for the LSS can be based upon rate gyros. In addition, since rate gyros typically have a temperature dependent drift and hence contain a low frequency bias, the present disclosure is also configured to account for the bias. Likewise, gearbox ratios have some variation from component to component. Accordingly, the present disclosure provides a method for detecting drivetrain issues despite such DC/low frequency measurement errors. More specifically, in an embodiment, systems and methods of the present disclosure are configured to compare speed measurements on opposing sides of a potential slip location (e.g., drivetrain connections) to detect failures. In addition, using filtering and/or in operation calibration enables the use of rate gyros for one or more of the speed measurements despite their propensity for sensor drift and/or bias errors.

Figure 1:
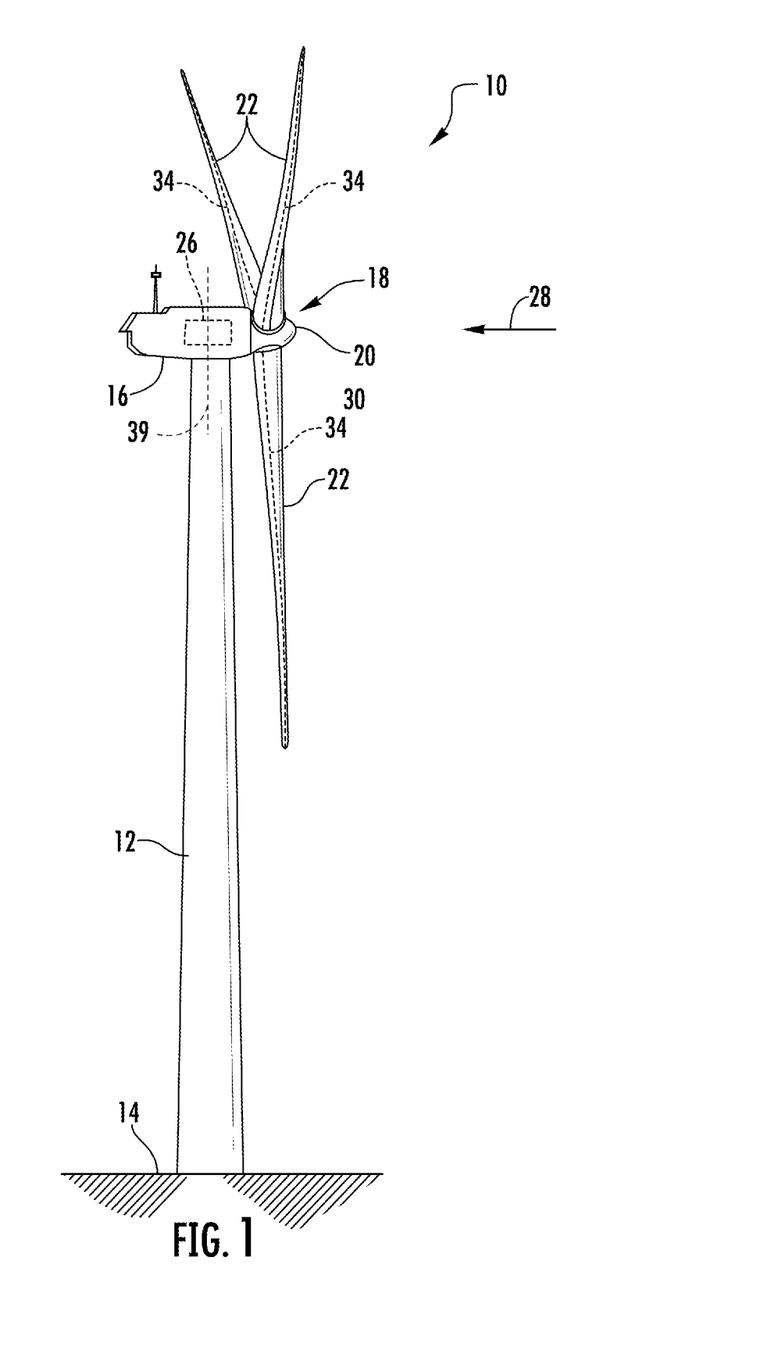
FIG. 1 illustrates a perspective view of a wind turbine according to an embodiment of the present disclosure.

Referring now to the drawings, FIG. 1 illustrates perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
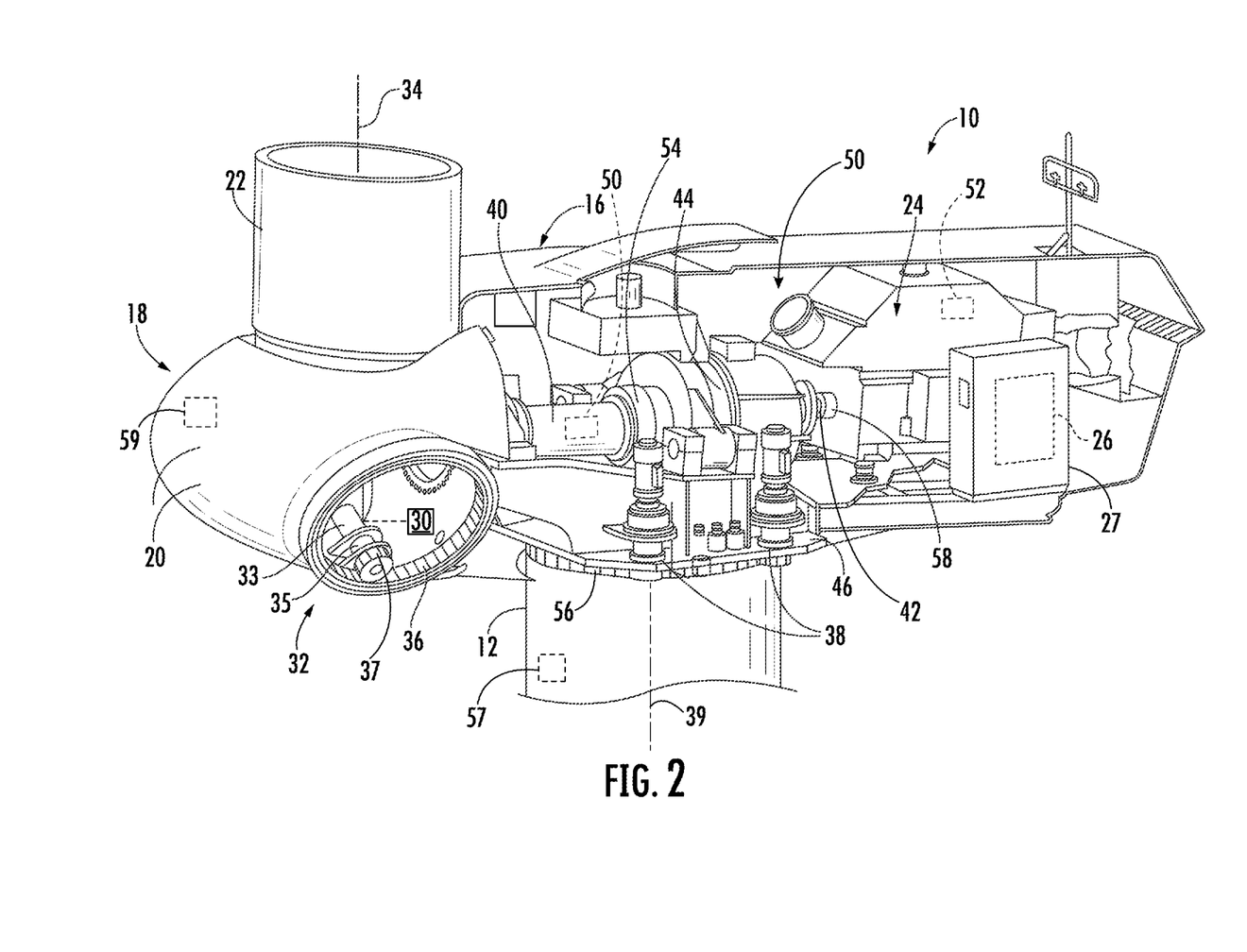
FIG. 2 illustrates a perspective, internal view of a nacelle of a wind turbine according to an embodiment of the present disclosure.

Referring now to FIG. 2, a simplified, internal view of an embodiment of the nacelle 16 of the wind turbine 10 is illustrated. As shown, the wind turbine 10 includes a generator 24 disposed within the nacelle 16. In general, the generator 24 may be coupled to the rotor 18 of the wind turbine 10 for generating electrical power from the rotational energy generated by the rotor 18. For example, the rotor 18 may include a rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40. Such components may be generally referred to herein as a drivetrain 50 or drivetrain assembly.

It should be appreciated that the rotor shaft 40 may generally be supported within the nacelle 16 by a support frame or bedplate 46 positioned atop the wind turbine tower 12. For example, the rotor shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 27 mounted to a portion of the nacelle 16. However, it should be appreciated that the turbine controller 26 may be disposed at any location on or in the wind turbine 10, at any location on the support surface 14 (FIG. 1) or generally at any other location. The turbine controller 26 may generally be configured to control the various operating modes (e.g., start-up or shut-down sequences) and/or components of the wind turbine 10.

As shown in FIG. 2, the wind turbine 10 may further include at least one pitch adjustment mechanism 32 for each of the rotor blades 22 that is configured to rotate each rotor blade 22 about its pitch axis 34. In an embodiment, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 36 coupled between the hub 20 and a corresponding rotor blade 22 such that rotation of the pitch drive pinion 37 causes rotation of the pitch bearing 36. Thus, in such embodiments, rotation of the pitch drive motor 33 drives the pitch drive gearbox 35 and the pitch drive pinion 37, thereby rotating the pitch bearing 36 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10 and rotating the nacelle 16 about a yaw axis 39).

Further, as shown, the turbine controller 26 may also be communicatively coupled to each pitch adjustment mechanism 32 of the wind turbine 10 through a separate or integral pitch controller 30 (FIG. 1) for controlling and/or altering the pitch angle of each respective rotor blade 22 (i.e., an angle that determines a perspective of the rotor blades 22 with respect to the direction 28 of the wind).

In addition, as shown in FIG. 2, one or more sensors 51, 52, 57, 59 may be provided on the wind turbine 10. More specifically, as shown, a shaft sensor 51 may be communicatively coupled with the rotor shaft 40 and/or the rotor 18 to monitor the speed thereof. Further, as shown, a generator sensor 52 may be communicatively coupled with the generator 24 to monitor the speed thereof. In addition, a tower sensor 57 may be provided on the tower 12 and/or a hub sensor 59 may be provided on the hub 20. Further embodiments may include any other suitable type of sensor, such as wind vanes, accelerometers, or similar. As such, the sensors 51, 52 may further be in communication with the controller 26 and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
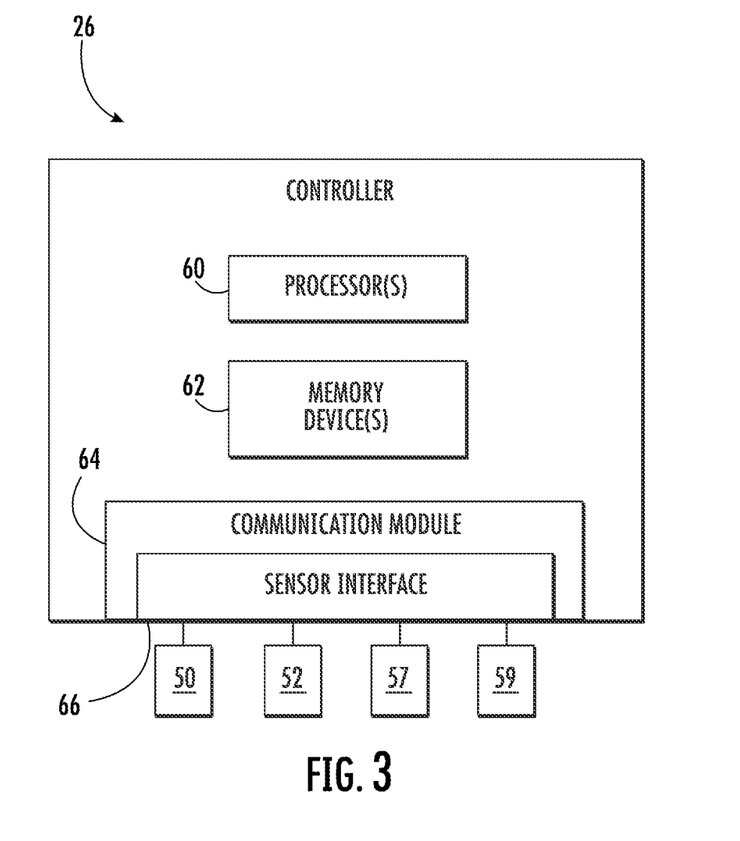
FIG. 3 illustrates a schematic diagram of an embodiment of suitable components that may be included in a wind turbine controller according to the present disclosure.

Referring now to FIG. 3, a block diagram of an embodiment of suitable components that may be included within the controller 26 according to the present disclosure is illustrated. As shown, the controller(s) 26 may include one or more processor(s) 60 and associated memory device(s) 62 configured to perform a variety of computer-implemented functions (e.g., performing the methods, steps, calculations and the like and storing relevant data as disclosed herein).

Additionally, the controller(s) 26 may also include a communications module 64 to facilitate communications between the controller(s) 26 and the various components of the wind turbine 10. Further, the communications module 64 may include a sensor interface 66 (e.g., one or more analog-to-digital converters) to permit signals transmitted from one or more sensors 51, 52 to be converted into signals that can be understood and processed by the processors 60. It should be appreciated that the sensors 51 and 52 may be communicatively coupled to the communications module 64 using any suitable means. For example, as shown in FIG. 3, the sensors 51 and 52 are coupled to the sensor interface 66 via a wired connection. However, in other embodiments, the sensors 51, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26 to perform various functions including, but not limited to, transmitting suitable control signals to implement corrective action(s) in response to a distance signal exceeding a predetermined threshold as described herein, as well as various other suitable computer-implemented functions.

Figure 4:
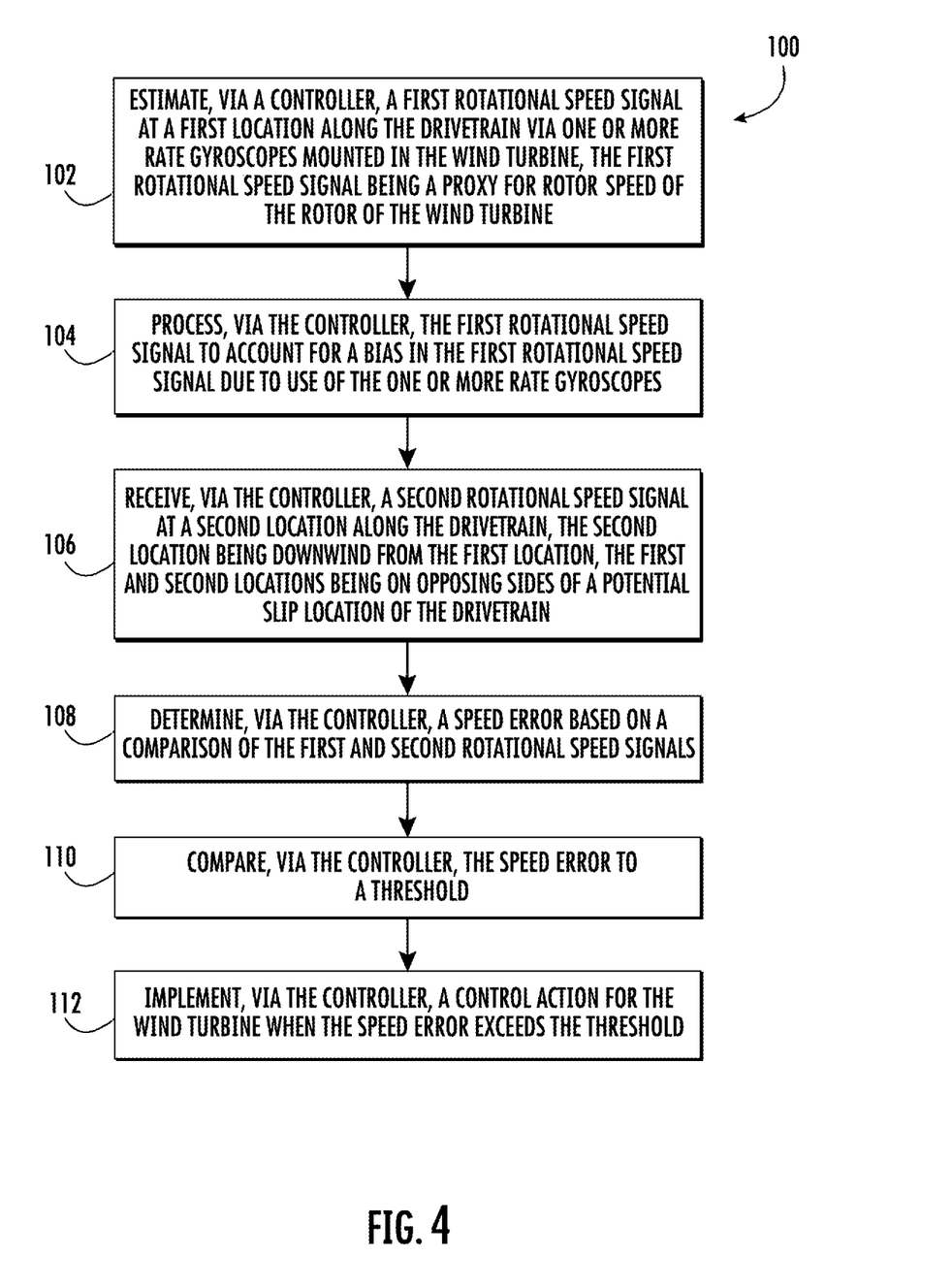
FIG. 4 illustrates a flow diagram of an embodiment of a method for detecting and responding to a failure in a drivetrain of a wind turbine according to the present disclosure.

Referring now to FIG. 4, a flow diagram of an embodiment of a method 100 for detecting and responding to a failure in a drivetrain of a wind turbine is illustrated. The method 100 may be implemented using, for instance, the wind turbine 10 and the controller 26 discussed above with reference to FIGS. 1-3. FIG. 4 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously, or modified in numerous ways without deviating from the scope of the present disclosure.

As shown at (102), the method 100 includes estimating, via a controller (such as controller 26), a first rotational speed signal at a first location along the drivetrain via one or more rate gyroscopes mounted in the wind turbine 10 (such as in the hub 20 or anywhere along the drivetrain 50), the first rotational speed signal being a proxy for rotor speed of the rotor 18 of the wind turbine 10.

Furthermore, in an embodiment, the first location may correspond to a location on or within the hub 20 and/or on the rotor shaft 40. In other words, the method 100 may include estimating the first rotational speed signal via one or more rate gyroscopes (also known as a rate gyro) mounted in the hub 20 of the wind turbine 10 or at a point rigidly connected to the hub 20. As used herein, a rate gyro generally refers to a type of gyroscope that indicates the rate of change of an angle with respect to time. If a gyro has only one gimbal ring, with consequently only one plane of freedom, it can be adapted for use as a rate gyro to measure a rate of angular movement. In addition, the rate gyros described herein may also encompass micro-electro-mechanical system (MEMS) gyroscopes.

The rate gyro(s) as described herein is generally effective at detecting fast speed changes but can have a drift (e.g., due to temperature and/or a variety of other factors) and hence can contain a bias, such as a low frequency bias or a DC bias. The bias may also be present because rate gyro(s) can be difficult to calibrate after providing power thereto as the rate gyro(s) are rarely truly still. Thus, the method 100 of the present disclosure can detect drivetrain issues despite such measurement errors. In particular, as shown at (104), the method 100 includes processing, via the controller 26, the first rotational speed signal to account for a bias in the first rotational speed signal due to use of the one or more rate gyroscopes.

As shown at (106), the method 100 includes receiving, via the controller 26, a second rotational speed signal from a second location along the drivetrain 50, the second location being downwind from the first location, the first and second locations being on opposing sides of a potential slip location 54, 58 of the drivetrain 50. In an embodiment, the second rotational speed signal may be measured using any suitable sensor, such as a bolt counter, a slip ring sensor, a tachometer sensor, and/or another one or more rate gyros. Furthermore, in an embodiment, the second location may correspond to a location on the generator 24. In such embodiments, for example, the second rotational speed signal may be a proxy for generator speed of the generator 24 of the wind turbine 10. Accordingly, in an embodiment, the first and second rotational speed signals may be collected at the extremes of the drivetrain 50 (e.g., at the rotor 18 and at the generator 24). In other embodiments, the first and second rotational speed signals can be collected from either side of each slipping element such that the controller 26 can determine which component actually slipped. In still further embodiments, any number of speed signals may be collected and analyzed according to the present disclosure, e.g., for estimating the presence of a slip as well as the location of the slip.

Further, as shown in FIG. 2, the potential slip location(s) 54, 58 of the drivetrain 50 may be a LSS coupling 54 or shrink fit, a HSS coupling 58 or shrink fit, and/or a gearbox connection. In some embodiments, the method 100 may optionally include utilizing information from one or more accelerometers (e.g., which could be any of sensors 51, 52, 57, 59) mounted in the nacelle 16 to estimate the first rotational speed signal. In such embodiments, the accelerometer(s) are configured to reduce the impact that lateral accelerations on the rotor 18 have on the estimate of the first rotational speed signal.

Furthermore, as shown at (108), the method 100 includes determining, via the controller 26, a speed error based on a comparison of the first and second rotational speed signals. For example, in an embodiment, determining the speed error based on the comparison of the first and second rotational speed signals may include determining a difference between the first rotational speed signal and the second rotational speed signal.

In additional embodiments, processing the first rotational speed signal to account for the bias in the first rotational speed signal due to use of the one or more rate gyroscopes may include correcting at least one of the low frequency bias or the DC bias of the first rotational speed signal using the second rotational speed signal before determining the speed error. In such embodiments, for example, correcting the low frequency bias or the DC bias of the first rotational speed signal using the second rotational speed signal may include low pass filtering the second rotational speed signal to determine a bias offset and then subsequently adding the bias offset to the first rotational speed signal. In alternative embodiments, the method 100 may include high pass filtering the speed error prior to comparing the speed error to the threshold.

More specifically, in an embodiment, the method 100 may including estimating the first rotational speed signal (e.g., rotor speed) using rate gyro(s) installed in the hub 20 or at a point rigidly connected to the hub 20, where the rate gyro(s) are periodically calibrated (e.g., against the bias offset) whilst spinning using a high-fidelity speed measurement elsewhere in the drivetrain (e.g., generator speed). In such embodiments, the speed measurement elsewhere in the drivetrain 50 can be used as a plausibility check for the rate gyro based speed measurement.

Accordingly, and referring still to FIG. 4, as shown at (110), the method 100 includes comparing, via the controller 26, the speed error to a threshold. In an embodiment, the threshold may be a variable threshold dependent on at least one of rotor speed, torque, wind speed, or functions thereof. In another embodiment, the threshold may be a fixed threshold. In addition, shown at (112), the method 100 includes implementing, via the controller 26, a control action for the wind turbine 10 when the speed error exceeds the threshold. For example, in an embodiment, implementing the control action for the wind turbine 10 may include shutting down the wind turbine 10, derating the wind turbine 10, yawing the nacelle 16 of the wind turbine 10, or pitching one or more rotor blades 22 of the wind turbine 10.

Figure 5:
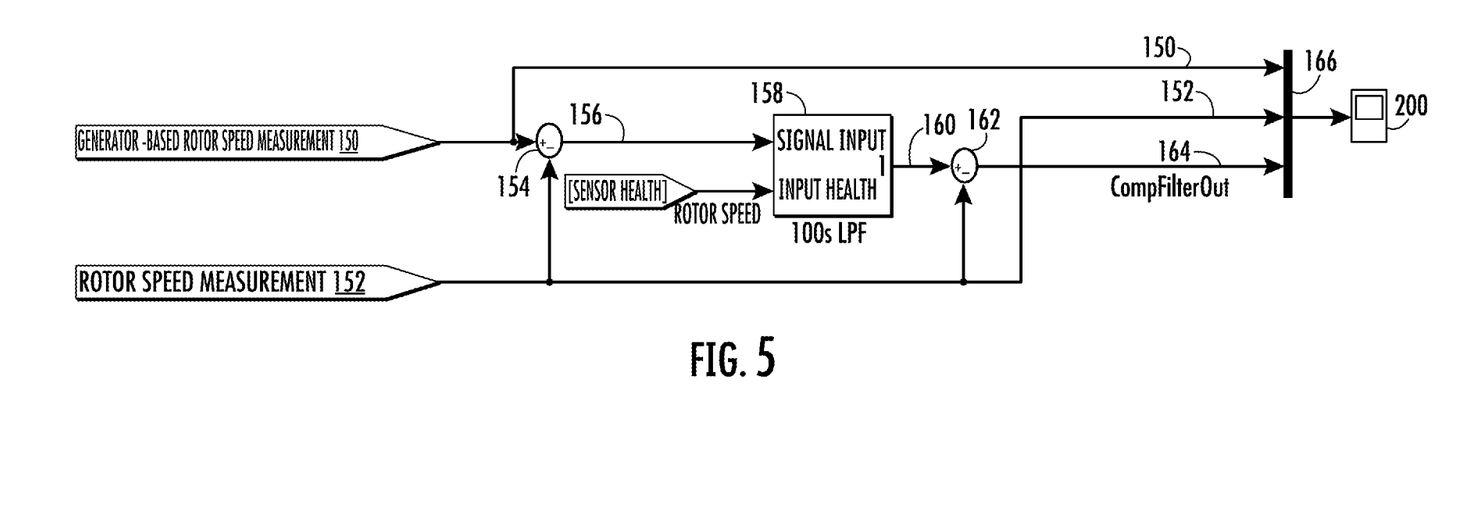
FIG. 5 illustrates a schematic diagram of an embodiment of a controller configured to detect and respond to a failure in a drivetrain of a wind turbine according to the present disclosure.

The method 100 of FIG. 4 can be better understood with reference to FIG. 5, which is provided for example purposes only and is not meant to be limiting. More specifically, as shown, FIG. 5 illustrates a schematic diagram of an embodiment of a controller, such as controller 26, implementing drivetrain speed protections for a wind turbine according to the present disclosure. In particular, as shown, the drivetrain speed protections include implementing a complementary filter (e.g., configured as a low pass filter) to offset the low frequency bias from the rate gyro described herein.

More specifically, in the illustrated embodiment, the controller 26 is configured to receive first and second rotational speed signals, such as a rotor speed measurement 152 and a generator-based rotor speed measurement 150. Thus, as shown at 154, the controller 26 is configured to determine a difference 156 between the rotor speed measurement 152 and the generator-based rotor speed measurement 150. Furthermore, in an embodiment, the controller 26 may also include a low pass filter 158.

As such, the controller 26 is configured to correct a bias of the rotor speed measurement 152 using the generator-based rotor speed measurement 150. More specifically, as previously discussed, when the rotor speed measurement 152 is measured via the rate gyro(s), which are generally effective at detecting fast speed changes but can contain a low frequency bias or a DC bias, the controller 26 is configured to offset such bias. In particular, as shown, the controller 26 is configured to correct for the bias of the rotor speed measurement 152 using the generator-based rotor speed measurement 150 by determining a difference between the rotor speed measurement 152 using the generator-based rotor speed measurement 150 and filtering the difference using a low pass filter 158. In such embodiments, the low pass filter 158 may have a slow timescale, such as about 100 seconds. Thus, as shown, the output of the low pass filter 158 corresponds to a bias offset 160. Further, as shown at 162, the controller 26 is then configured to subsequently add the bias offset 160 to the rotor speed measurement 152 to obtain a sum 164 (e.g., CompFilterOut). Accordingly, as shown at 166, the generator-based rotor speed measurement 150, the rotor speed measurement 152, and the CompFilterOut signal 164 can be compared to determine whether a slip has occurred in the drivetrain 50.

Figure 6:
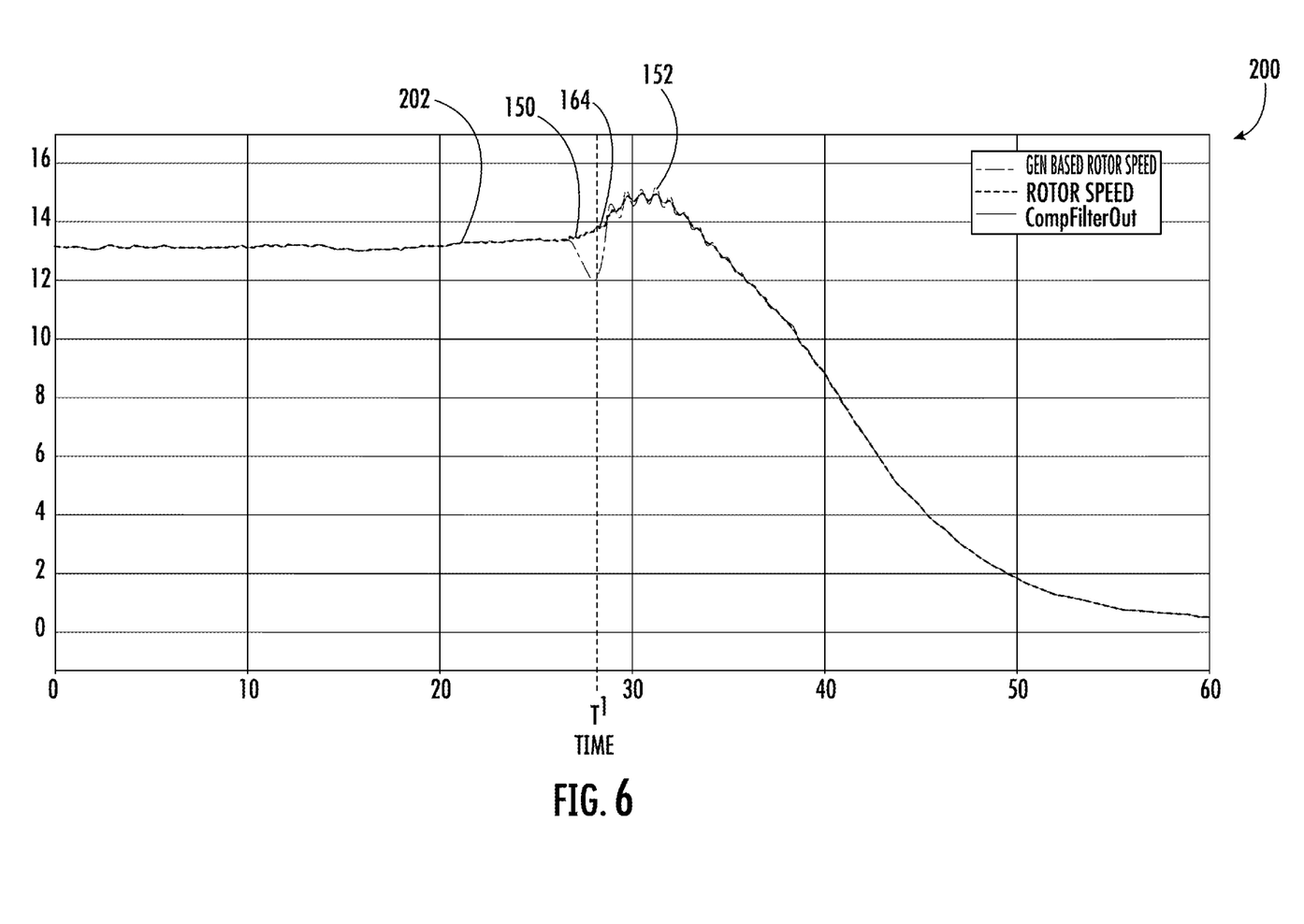
FIG. 6 illustrates a graph of a generator-based rotor speed measurement, a rotor speed measurement, and an output of a complementary filter of a controller plotted together as a function of time according to the present disclosure.

More specifically, as shown in FIGS. 5 and 6, the controller 26 may be configured to generate a graph 200 that plots the generator-based rotor speed measurement 150, the rotor speed measurement 152, and the CompFilterOut signal 164 together as a function of time. Thus, as shown particularly in FIG. 6, the rotor speed measurement 152, the CompFilterOut signal 164, and the generator-based rotor speed measurement 150 generally match or follow each other, except for instances where a slip occurs (e.g., as shown at time Ti) as well as instances when oscillations are present in the twisting direction of the rotor shaft 40. For example, as shown, the generator-based rotor speed measurement 150 includes a dip 202 at time Ti when a slip occurs in one of the drivetrain connections (such as the LSS coupling 54 or the HSS coupling 58). In such embodiments, the controller 26 can easily detect the presence of a slip using the systems and methods described herein. For instances when oscillations are present in the twisting direction of the rotor shaft 40, the controller 26 is configured to set thresholds high enough that the wind turbine 10 does not trip.

In additional embodiments, the present disclosure described herein may also include various diagnostic functions that monitor the health of the first and second rotational speed signals. Thus, in such embodiments, if such signals freeze, as an example, the systems and methods of the present disclosure are configured to trip the wind turbine 10 since the controller 26 can no longer determine whether a slip (or other failure) is present.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or conducted in a manner that achieves or optimizes one advantage or group of advantages as taught herein without necessarily achieving other objects or advantages as may be taught or suggested herein.

Various aspects and embodiments of the present disclosure are defined by the following numbered clauses:

A method for detecting and responding to a failure in a drivetrain of a wind turbine, the drivetrain having, at least, a rotor and a generator, the method comprising: estimating, via a controller, a first rotational speed signal at a first location along the drivetrain via one or more rate gyroscopes mounted in the wind turbine, the first rotational speed signal being a proxy for rotor speed of the rotor of the wind turbine; processing, via the controller, the first rotational speed signal to account for a bias in the first rotational speed signal due to use of the one or more rate gyroscopes; receiving, via the controller, a second rotational speed signal at a second location along the drivetrain, the second location being downwind from the first location, the first and second locations being on opposing sides of a potential slip location of the drivetrain; determining, via the controller, a speed error based on a comparison of the first and second rotational speed signals; comparing, via the controller, the speed error to a threshold; and implementing, via the controller, a control action for the wind turbine when the speed error exceeds the threshold.

The method of any preceding clause, wherein the second rotational speed signal is a proxy for generator speed of the generator of the wind turbine.

The method of any preceding clause, wherein the bias comprises at least one of a low frequency bias or a DC bias, and wherein processing the first rotational speed signal to account for the bias in the first rotational speed signal due to use of the one or more rate gyroscopes further comprises correcting at least one of the low frequency bias or the DC bias of the first rotational speed signal using the second rotational speed signal before determining the speed error.

The method of any preceding clause, wherein correcting at least one of the low frequency bias or the DC bias of the first rotational speed signal using the second rotational speed signal before determining the speed error further comprises: low pass filtering the second rotational speed signal to determine a bias offset; and adding the bias offset to the first rotational speed signal.

The method of any preceding clause, wherein processing the first rotational speed signal to account for the bias in the first rotational speed signal due to use of the one or more rate gyroscopes further comprises: high pass filtering the speed error prior to comparing the speed error to the threshold.

The method of any preceding clause, wherein determining the speed error based on the comparison of the first and second rotational speed signals further comprises: determining a difference between the first rotational speed signal and the second rotational speed signal.

The method of any preceding clause, wherein the potential slip location of the drivetrain comprises at least one of a low-speed shaft coupling, a low-speed shaft shrink fit, a high-speed shaft coupling, a high-speed shaft shrink fit, or a gearbox connection.

The method of any preceding clause, further comprising utilizing information from one or more accelerometers mounted in a nacelle of the wind turbine to estimate the first rotational speed signal.

The method of any preceding clause, wherein the threshold is a variable threshold dependent on at least one of rotor speed, torque, wind speed, or functions thereof.

The method of any preceding clause, wherein the threshold is a fixed threshold.

The method of any preceding clause, wherein implementing the control action for the wind turbine further comprises at least one of shutting down the wind turbine, derating the wind turbine, yawing a nacelle of the wind turbine, or pitching one or more rotor blades of the wind turbine.

A drivetrain assembly of a wind turbine, the drivetrain assembly comprising: a rotor shaft for coupling to a rotor of the wind turbine; a gearbox coupled to the rotor shaft; a generator coupled to the gearbox via a generator shaft; and a controller for controlling operation of the wind turbine, the controller comprises at least one processor, the at least one processor configured to perform a plurality of operations, the plurality of operations comprising: estimating a first rotational speed signal at a first location along the drivetrain via one or more rate gyroscopes mounted in the wind turbine, the first rotational speed signal being a proxy for rotor speed of the rotor of the wind turbine; processing the first rotational speed signal to account for a bias in the first rotational speed signal due to use of the one or more rate gyroscopes; receiving a second rotational speed signal from a second location along the drivetrain assembly, the second location being downwind from the first location, the first and second locations being on opposing sides of a potential slip location of the drivetrain assembly; determining a speed error based on a comparison of the first and second rotational speed signals; comparing the speed error to a threshold; and implementing a control action for the wind turbine when the speed error exceeds the threshold.

The drivetrain assembly of any preceding clause, wherein the second rotational speed signal is a proxy for generator speed of the generator of the wind turbine.

The drivetrain assembly of any preceding clause, wherein the bias comprises at least one of a low frequency bias or a DC bias, and wherein processing the first rotational speed signal to account for the bias in the first rotational speed signal due to use of the one or more rate gyroscopes further comprises correcting at least one of the low frequency bias or the DC bias of the first rotational speed signal using the second rotational speed signal before determining the speed error.

The drivetrain assembly of any preceding clause, wherein correcting at least one of the low frequency bias or the DC bias of the first rotational speed signal using the second rotational speed signal before determining the speed error further comprises: low pass filtering the second rotational speed signal to determine a bias offset; and adding the bias offset to the first rotational speed signal.

The drivetrain assembly of any preceding clause, wherein processing the first rotational speed signal to account for the bias in the first rotational speed signal due to use of the one or more rate gyroscopes further comprises: high pass filtering the speed error prior to comparing the speed error to the threshold.

The drivetrain assembly of any preceding clause, wherein determining the speed error based on the comparison of the first and second rotational speed signals further comprises: determining a difference between the first rotational speed signal and the second rotational speed signal.

The drivetrain assembly of any preceding clause, wherein the potential slip location of the drivetrain comprises at least one of a low-speed shaft coupling, a low-speed shaft shrink fit, a high-speed shaft coupling, a high-speed shaft shrink fit, or a gearbox connection.

The drivetrain assembly of any preceding clause, wherein the plurality of operations further comprise utilizing information from one or more accelerometers mounted in a nacelle of the wind turbine to estimate the first rotational speed signal.

The drivetrain assembly of any preceding clause, wherein implementing the control action for the wind turbine further comprises at least one of shutting down the wind turbine, derating the wind turbine, yawing a nacelle of the wind turbine, or pitching one or more rotor blades of the wind turbine.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting and responding to a failure in a drivetrain of a wind turbine, the drivetrain having, at least, a rotor and a generator, the method comprising:
    estimating, via a controller, a first rotational speed signal at a first location along the drivetrain via one or more rate gyroscopes mounted in the wind turbine, the first rotational speed signal being a proxy for rotor speed of the rotor of the wind turbine;
    receiving, via the controller, a second rotational speed signal at a second location along the drivetrain, the second location being downwind from the first location, the first and second locations being on opposing sides of a potential slip location of the drivetrain;
    processing, via the controller, the first rotational speed signal using the second rotational speed signal to account for a bias in the first rotational speed signal resulting from estimating the first rotational speed signal via the one or more rate gyroscopes;
    determining, via the controller, a speed error based on a comparison of the processed first rotational speed signal and the second rotational speed signal;
    comparing, via the controller, the speed error to a threshold; and
    implementing, via the controller, a control action for the wind turbine when the speed error exceeds the threshold.

2. The method of claim 1, wherein the second rotational speed signal is a proxy for generator speed of the generator of the wind turbine.

3. The method of claim 1, wherein the bias comprises at least one of a low frequency bias or a DC bias, and wherein processing the first rotational speed signal to account for the bias in the first rotational speed signal further comprises correcting at least one of the low frequency bias or the DC bias of the first rotational speed signal using the second rotational speed signal before determining the speed error.

4. The method of claim 3, wherein correcting at least one of the low frequency bias or the DC bias of the first rotational speed signal using the second rotational speed signal before determining the speed error further comprises:
    low pass filtering the second rotational speed signal to determine a bias offset; and
    adding the bias offset to the first rotational speed signal.

5. The method of claim 3, further comprising:
    high pass filtering the speed error prior to comparing the speed error to the threshold.

6. The method of claim 1, wherein determining the speed error further comprises:
    A determining a difference between the processed-first rotational speed signal and the second rotational speed signal.

7. The method of claim 1, wherein the potential slip location of the drivetrain comprises at least one of a low-speed shaft coupling, a low-speed shaft shrink fit, a high-speed shaft coupling, a high-speed shaft shrink fit, or a gearbox connection.

8. The method of claim 1, further comprising utilizing information from one or more accelerometers mounted in a nacelle of the wind turbine in estimating the first rotational speed signal.

9. The method of claim 1, wherein the threshold is a variable threshold dependent on at least one of rotor speed, torque, wind speed, or functions thereof.

10. The method of claim 1, wherein the threshold is a fixed threshold.

11. The method of claim 1, wherein implementing the control action for the wind turbine further comprises at least one of shutting down the wind turbine, derating the wind turbine, yawing a nacelle of the wind turbine, or pitching one or more rotor blades of the wind turbine.

12. A drivetrain assembly of a wind turbine, the drivetrain assembly comprising:
    a rotor shaft for coupling to a rotor of the wind turbine;
    a gearbox coupled to the rotor shaft;
    a generator coupled to the gearbox via a generator shaft; and
    a controller for controlling operation of the wind turbine, the controller comprises at least one processor, the at least one processor configured to perform a plurality of operations, the plurality of operations comprising:
        estimating a first rotational speed signal at a first location along the drivetrain via one or more rate gyroscopes mounted in the wind turbine, the first rotational speed signal being a proxy for rotor speed of the rotor of the wind turbine;
        receiving a second rotational speed signal from a second location along the drivetrain assembly, the second location being downwind from the first location, the first and second locations being on opposing sides of a potential slip location of the drivetrain assembly;
        processing the first rotational speed signal using the second rotational speed signal to account for a bias in the first rotational speed signal resulting from estimating the first rotational speed signal via the one or more rate gyroscopes;

determining a speed error based on a comparison of the processed first rotational speed signal and the second rotational speed signal;

comparing the speed error to a threshold; and implementing a control action for the wind turbine when the speed error exceeds the threshold.

13. The drivetrain assembly of claim 12, wherein the second rotational speed signal is a proxy for generator speed of the generator of the wind turbine.

14. The drivetrain assembly of claim 12, wherein the bias comprises at least one of a low frequency bias or a DC bias, and wherein processing the first A rotational speed signal to account for the bias in the first rotational speed signal further comprises correcting at least one of the low frequency bias or the DC bias of the first rotational speed signal using the second rotational speed signal before determining the speed error.

15. The drivetrain assembly of claim 14, wherein correcting at least one of the low frequency bias or the DC bias of the first rotational speed signal using the second rotational speed signal before determining the speed error further comprises:

low pass filtering the second rotational speed signal to determine a bias offset; and adding the bias offset to the first rotational speed signal.

16. The drivetrain assembly of claim 12, further comprising:

high pass filtering the speed error prior to comparing the speed error to the threshold.

17. The drivetrain assembly of claim 12, wherein determining the speed error further comprises:

determining a difference between the processing-first rotational speed signal and the second rotational speed signal.

18. The drivetrain assembly of claim 12, wherein the potential slip location of the drivetrain comprises at least one of a low-speed shaft coupling, a low-speed shaft shrink fit, a high-speed shaft coupling, a high-speed shaft shrink fit, or a gearbox connection.

19. The drivetrain assembly of claim 12, wherein the plurality of operations further comprise utilizing information from one or more accelerometers mounted in a nacelle of the wind turbine in estimating the first rotational speed signal.

20. The drivetrain assembly of claim 12, wherein implementing the control action for the wind turbine further comprises at least one of shutting down the wind turbine, derating the wind turbine, yawing a nacelle of the wind turbine, or pitching one or more rotor blades of the wind turbine.

* * * * *